(12) United States Patent
Usui

(10) Patent No.: US 6,434,100 B1
(45) Date of Patent: Aug. 13, 2002

(54) OPTICAL DISC REPRODUCING APPARATUS

(75) Inventor: Shunji Usui, Shirakawa (JP)

(73) Assignee: Nippon Columbia Co., Ltd., Tokyo (JP)

( * ) Notice: Subject to any disclaimer, the term of this patent is extended or adjusted under 35 U.S.C. 154(b) by 20 days.

(21) Appl. No.: 09/671,367

(22) Filed: Sep. 28, 2000

(30) Foreign Application Priority Data

Nov. 9, 1999 (JP) ............................................. 11-318697

(51) Int. Cl.$^7$ ................................................. G11B 3/90
(52) U.S. Cl. ................................. 369/53.31; 369/47.32
(58) Field of Search ........................... 369/30.01, 30.03, 369/30.05, 30.18, 30.19, 30.23, 32.01, 47.13, 47.28, 47.32, 47.33, 53.31, 53.34, 53.44, 60.01

(56) References Cited

U.S. PATENT DOCUMENTS 6,058,179 A    5/2000   Usui

FOREIGN PATENT DOCUMENTS

| JP | 7-6512 | 1/1995 |
|----|--------|--------|
| JP | 7-29183 | 1/1995 |

*Primary Examiner*—Paul W. Huber
(74) *Attorney, Agent, or Firm*—Dickstein Shapiro Morin & Oshinsky LLP

(57) ABSTRACT

There is provided an optical disk reproducing apparatus comprising a pickup component for detecting digital audio data from an optical disk, a storing component for temporarily storing the digital audio data detected by the pickup component, an input component for inputting the reproducing direction and reproducing speed of the digital audio data, a control component for controlling reading and writing so as to control the reading direction and reading speed of the digital audio data stored on the storing component based on the reproducing direction and reproducing speed inputted from the input component, and a signal processing component for converting the digital audio data read from the storing component into an analog audio signal and outputting the analog signal, wherein the storing component is for storing the digital audio data before and after the digital audio data to be read by the control component.

4 Claims, 6 Drawing Sheets

OPTICAL DISC REPRODUCING APPARATUS

BACKGROUND OF THE INVENTION

1. Field of the Invention

The present invention relates to an optical disc reproducing apparatus that can reproduce audio data recorded on an optical disc and can be operated at a variable reproducing speed.

2. Related Background Art

An optical disc reproducing apparatus for so-called DJ (disc jockey) is used in a dance hall, discotheque, or the like to edit and reproduce, while varying the reproducing speed, data (audio data) of a sound, music, voice, or the like within an audible frequency range digital-recorded on an optical disc.

Besides, there is a special reproducing operation called scratch reproduction in which a disc jockey, using an analog player for reproducing an analog-recorded disc, places the needle on the analog disc and turns the turntable back and forth quickly so as to generate scratch sounds.

In order to perform scratch reproduction on a conventional optical disc reproducing apparatus for a digital-recorded disc such as CD (compact disc), necessary audio data must be stored in a memory after a normal-speed reproduction operation is started. In doing this, however, already-reproduced audio data, that is, the data before the present reproducing position can be stored on the memory but not-yet-reproduced audio data, that is, the data after the present reproducing position cannot be stored on the memory and, therefore, is not available for the scratch reproduction.

For this reason, only possible way for performing scratch reproduction of any not-yet-reproduced audio data is to read the audio data actually from the optical disc and reproduce it at a varying speed operated in the scratch reproduction. However, if it is attempted to vary the reading speed of data from the optical disc quickly as above, the operation for detecting the audio data recorded on the optical disc becomes unstable and the operation for varying the reproducing speed is restricted. Thus, it is difficult to perform scratch reproduction during a normal-speed reproduction operation.

As a way for performing false scratch reproduction, there is available a method for processing audio data as if the reproducing speed is varied, in which the actual reproducing speed is not changed but some audio data is skipped or interpolated so that the apparent frequency of the audio data is varied. As compared to the scratch reproduction in which the reproducing speed of audio data is varied, however, this method involves a problem that the sound quality changes.

In performing scratch reproduction using audio data detected from an optical disc, it is a common practice that audio data necessary for the scratch reproduction is stored beforehand in a memory, separately from the audio data being reproduced from the optical disc at a normal speed, and the scratch reproduction is performed independently from the normal-speed reproduction. Because of this, it is impossible to combine the reproduction operation of an optical disc with the scratch reproduction operation so as to perform the scratch reproduction during the normal-speed reproduction and then return the operation to the normal-speed reproduction mode at the end position of the scratch reproduction as was done conventionally with an analog disc.

SUMMARY OF THE INVENTION

It is an objective of the present invention to provide an optical disc reproducing apparatus for reproducing a digital-recorded disc such as CD which can start scratch reproduction during normal-speed reproduction without terminating the reproduction of audio data from the optical disc and return to the normal-speed reproduction after the scratch reproduction is ended so as to perform similar scratch reproduction to that with an analog disc.

An optical disc reproducing apparatus in claim 1 of the invention comprises a pickup means for detecting digital audio data recorded on an optical disc, a storing means for storing the digital audio data detected by the pickup means, an input means for inputting the reproducing direction and reproducing speed of the digital audio data, a control means for controlling the reading and writing of the digital audio data from/into the storing means so as to control the reading direction and reading speed of the digital audio data stored on the storing means based on the reproducing direction and reproducing speed inputted from the input means, and a signal processing means for converting the digital audio data read from the storing means into an analog audio signal and outputting the analog signal, wherein the control means controls the reading and writing of the digital audio data from/into the storing means so that the volume of the digital audio data outputted from the signal processing means becomes equal to the volume of the digital audio data not yet outputted from the signal processing means.

An optical disc reproducing apparatus in claim 2 of the invention comprises a pickup means for detecting digital audio data recorded on an optical disc, a first storing means for storing the digital audio data detected by the pickup means, a second storing means for storing the digital audio data read from the first storing means, an input means for inputting the reproducing direction and reproducing speed of the digital audio data, a control means for controlling the reading and writing of data from/into the storing means so as to control the reading direction and reading speed of the digital audio data stored on the first storing means and second storing means based on the reproducing direction and reproducing speed inputted from the input means, and a signal processing means for converting the digital audio data read from the first storing means or second storing means into an analog audio signal and outputting the analog signal, wherein the control means controls so that the digital audio data read from the first storing means is outputted from the signal processing means and, at the same time, is written into the second storing means.

An optical disc reproducing apparatus in claim 3 or claim 4 wherein the control means stores, when the reproducing direction and reproducing speed are inputted from the input means, whether the operation is in a normal-speed reproduction mode or a pause mode, and controls so that the operation returns to the normal-speed mode or the pause mode, when the reproduction mode, which is based on the reproduction direction and reproduction speed inputted from the input means, is ended.

According to the present invention, there is provided an optical disc reproducing apparatus which is capable of forward scratch reproduction and reverse scratch reproduction.

According to the present invention, there is provided an optical disc reproducing apparatus which can start scratch reproduction operation during the reproduction of an optical disk at a normal speed and return to the normal-speed reproduction operation after the scratch reproduction is ended.

DETAILED DESCRIPTION OF PREFERRED EMBODIMENTS

Figure 1:
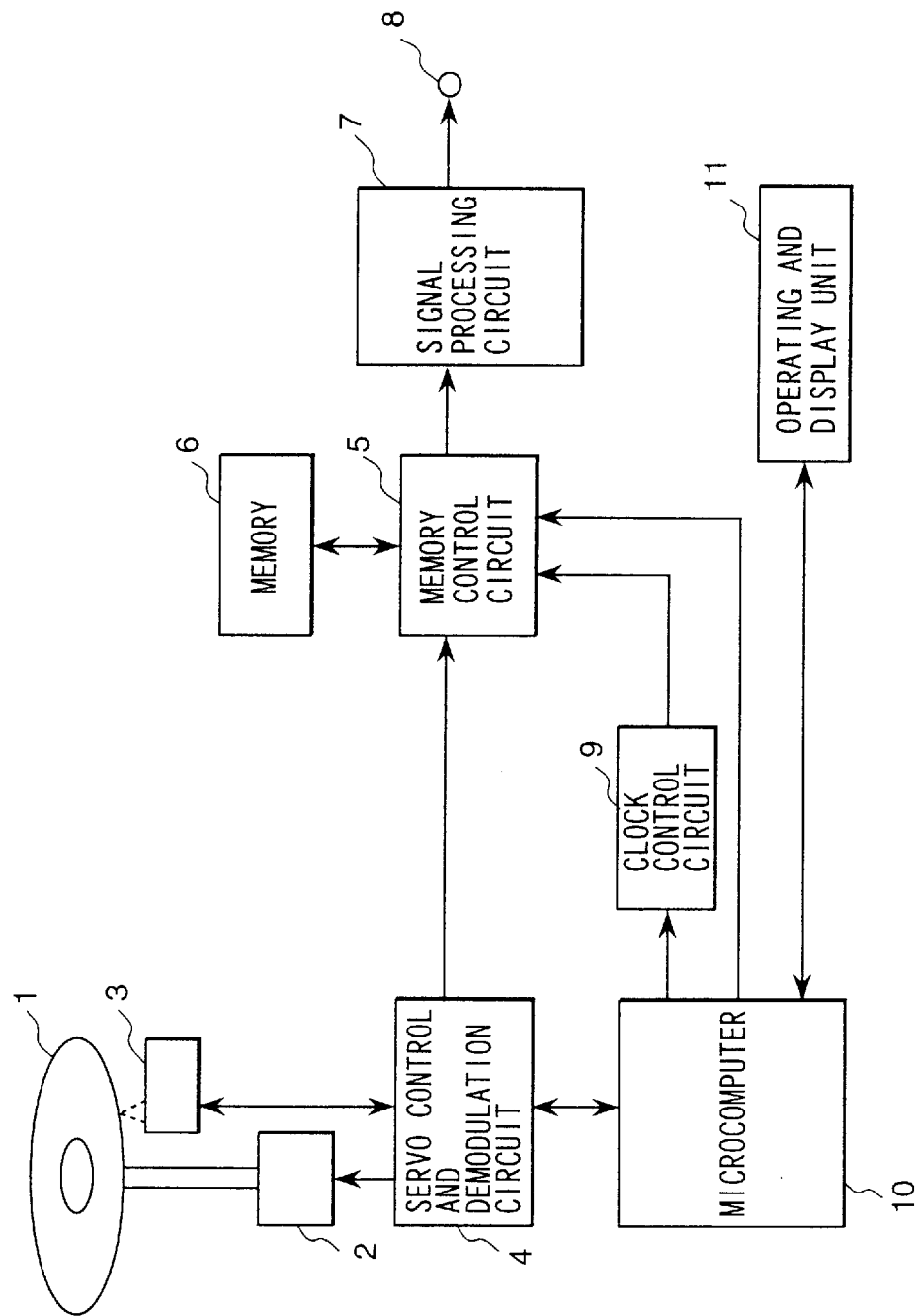
FIG. 1 is a block diagram showing the composition of an embodiment of an optical disc reproducing apparatus of the invention.

FIG. 1 is a block diagram showing the composition of an embodiment of an optical disc reproducing apparatus of the invention. An optical disc 1 is rotated by a spindle motor 2. In this embodiment, a CD on which audio data is digital-recorded is used as the optical disc 1. A pickup 3 radiates laser beam onto the rotated disc 1 and, with the reflection beam from the optical disc 1, detects the audio data recorded as pits on the optical disc 1.

A servo control and demodulating circuit 4 controls the rotation of the spindle motor 2, controls the operation of the pickup 3, and processes the demodulating signal of the audio data detected by the pickup 3.

The rotating speed of the spindle motor 2 is controlled by the servo control and demodulating circuit 4 using a synchronizing signal from the optical disc 1 detected by the pickup 3.

The audio data outputted from the servo control and demodulating circuit 4 is stored temporarily on a memory 6 via a memory control circuit 5. The memory control circuit 5 controls the storing and reading of the audio data on/from the memory 6.

A clock control circuit 9 generates and outputs a variable clock for varying the reading speed of the audio data from the memory 6.

The audio data read from the memory 6 via the memory control circuit 5 is outputted to an output terminal 8 via a signal processing circuit 7. The signal processing circuit 7 comprises a digital filter, a circuit for converting digital data into analog signal, and an amplifier.

A microcomputer 10 controls the servo control and demodulating circuit 4, memory control circuit 5, and clock control circuit 9. For inputting operation signals to the microcomputer 10 and for outputting display signals from the microcomputer 10, an operating and displaying unit 11, equipped with devices including an operation panel and a display for inputting the reproducing direction and reproducing speed or other information is connected to the microcomputer 10.

Figure 2:
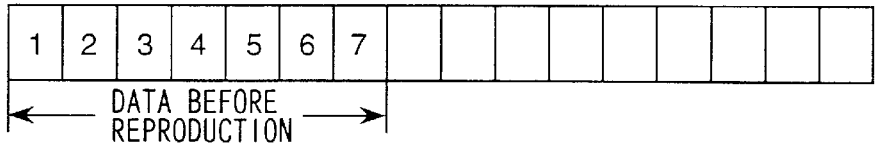
FIG. 2 is a diagram showing the allocation of audio data stored on a memory of an embodiment of an optical disc reproducing apparatus of the invention.
Figure 2:
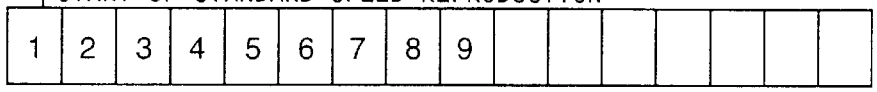
Figure 2:
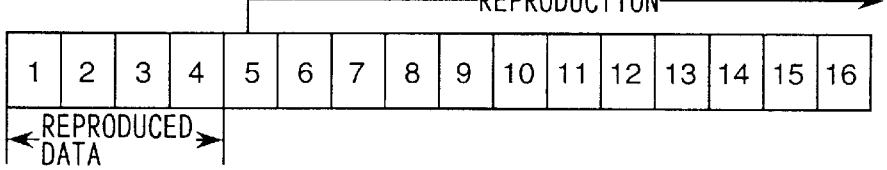
Figure 2:
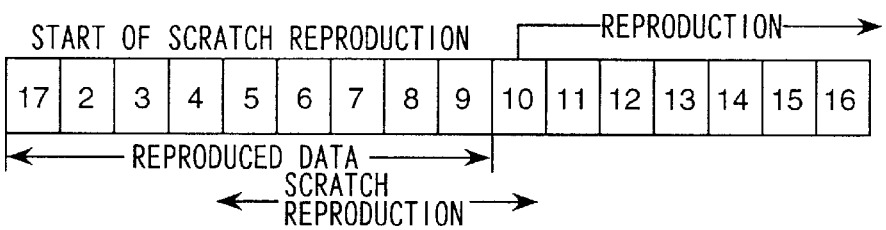
Figure 2:
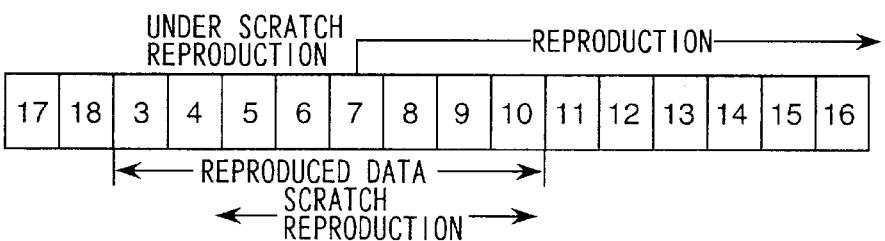
Figure 2:
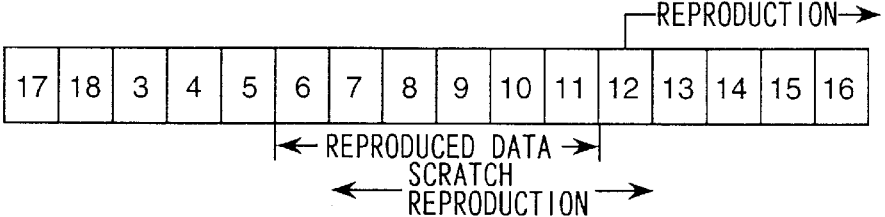
Figure 2:
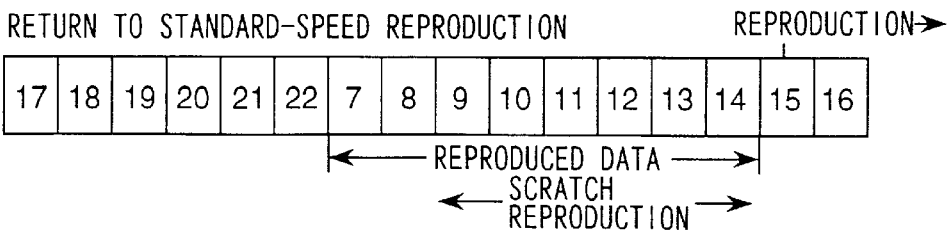
Figure 3:
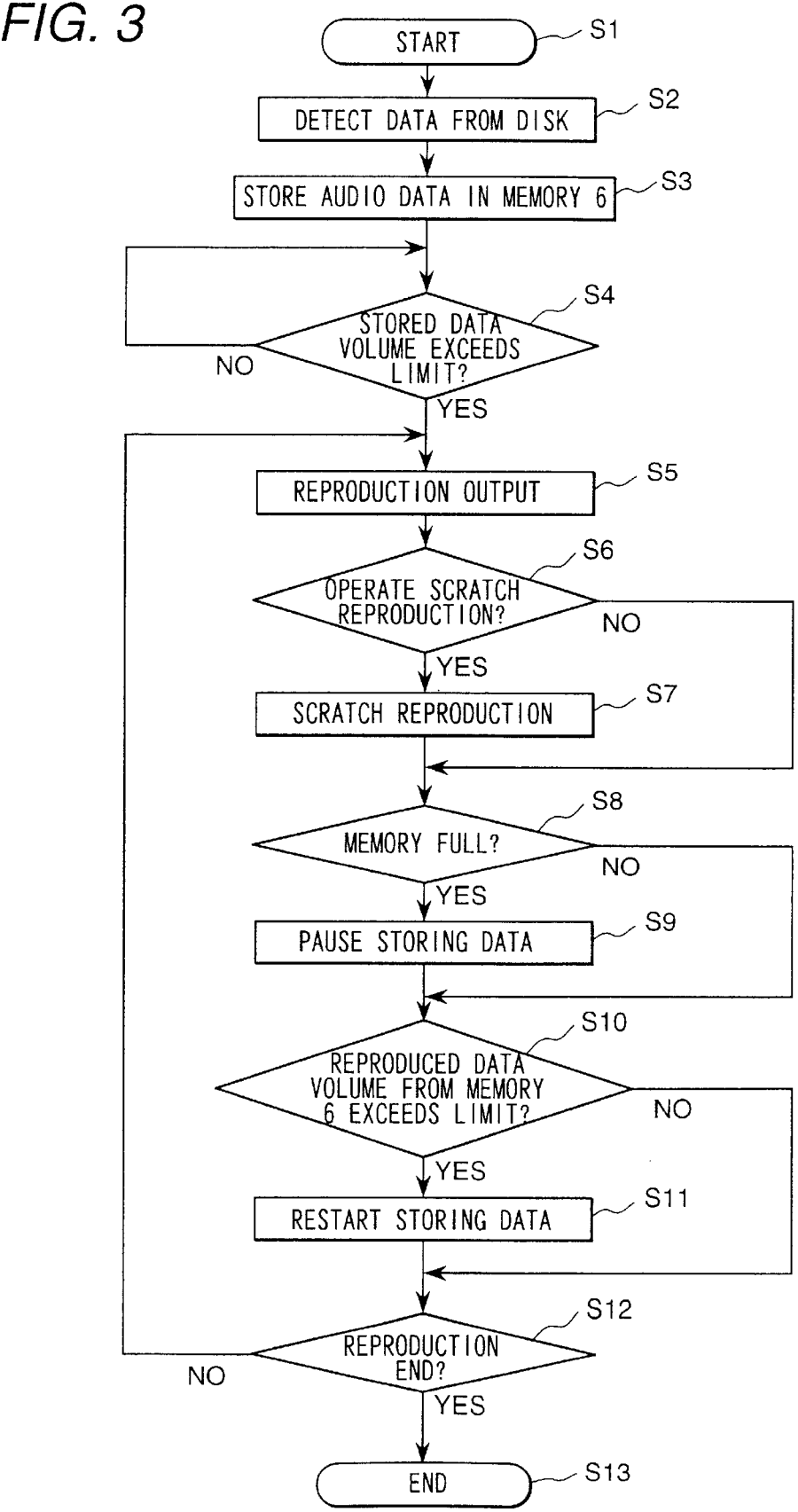
FIG. 3 is a flowchart showing the reproduction operation of an embodiment of an optical disc reproducing apparatus of the invention.

FIG. 2. shows the allocation of the audio data stored on the memory 6. FIG. 3 is a flowchart showing the reproduction operation of an embodiment of an optical disc reproducing apparatus of the invention.

Detection of the audio data recorded on the optical disc 1 is started using the pickup 3 (S1, S2). Audio data is detected from the optical disc 1 at double the normal reproducing speed of the CD set as the optical disc 1, and the audio data is stored on the memory 6 sequentially from the head data by the memory control circuit 5 (S3). As shown in FIG. 2 (1), the audio data is stored sequentially like No. 1, 2, 3, and so on. When the audio data volume stored on the memory 6 exceeds a specified volume (S4) that has been preset in the microcomputer 10 for use in the scratch reproduction operation, which will be described later, the memory circuit 5 reads and reproduces the audio data stored previously on the memory 6, sequentially from No. 1 as shown in FIG. 2 (2), at the reproducing speed that is synchronized with the clock outputted from the clock control circuit 9 by the control of the microcomputer 10 (S5).

If no scratch reproduction operation is needed (NO in S6), the normal-speed reproduction proceeds. The memory control circuit 5, while monitoring the available storage space and already-reproduced audio data on the memory 6, stores on the memory 6 the already-reproduced audio data of a length of time necessary for the scratch reproduction and the not-yet-reproduced audio data, as shown in FIG. 2 (3), and when the storage space of the memory 6 becomes full of both types of data (S8), pauses storing the audio data on the memory 6 (S9).

Upon this step, the microcomputer 10 pauses detecting data from the optical disc 1 using the pickup 3 and gets into a paused detection mode at the data position where storing the audio data is paused.

In this embodiment, the microcomputer 10 controls the storage volume of the audio data so that the already-reproduced data is stored by 50% and the not-yet-reproduced audio data is stored by 50% on the memory 6. Any ratio of the already-reproduced data volume to the not-yet-reproduced audio data volume can be preset in the microcomputer 10 as a specified volume so as to control the storage volume based on this specified volume.

Because the length of time of the audio data needed for the scratch reproduction is generally two to three seconds, where the audio data is subjected to reverse reproduction and forward reproduction repeatedly by turns, such memory is used that has the volume for storing each already-reproduced audio data and not-yet-reproduced audio data for a sufficient length of time longer than two to three seconds.

As the normal-speed reproduction continues and the already-reproduced audio data volume exceeds the specified volume (S10), the microcomputer 10 starts reproducing the optical disc 1 just before the data position at which the reproduction was last paused.

Then, the memory control circuit 5 compares the audio data last stored on the memory 6 (data 16 in FIG. 2 (3)) with the audio data detected from the optical disc 1 and, when the two pieces of the audio data coincide with each other, starts storing the inputted audio data on the memory 6, starting from the audio data next to the data position where storing the audio data detected from the optical disc 1 was last paused, updating the already-reproduced audio data stored there (S11). The microcomputer 10 controls storing the audio data so that the data volume of the not-yet-reproduced audio data is equal to that of the already-reproduced audio data on the memory 6. In FIG. 2 (4) the data volume is so controlled that the volume of the already-reproduced audio data 2 to 9 is equal to that of the not-yet-reproduced audio data 10 to 17. According as the audio data 10 is reproduced, the audio data 18 is written into the storage space of the audio data 2 (FIG. 2 (5)). The above operation is repeated during the normal-speed reproduction of the optical disc 1 and storing the audio data on the memory 6 continues (NO in S12).

The memory control circuit 5 monitors the volume of the not-yet-reproduced audio data out of the audio data stored on the memory 6, and when the data volume of the not-yet-reproduced audio data becomes equal to that of the already-reproduced audio data, pauses storing the audio data on the memory 6. On the other hand, the microcomputer 10 pauses detecting the audio data from the optical disc 1 and gets into a paused detection mode at the data position where storing the audio data is paused. As the normal-speed reproduction continues and the ratio of the not-yet-reproduced data to the already-reproduced data on the memory 6 changes, the microcomputer 10 starts detecting the audio data from the optical disc 1, starting from data just before the data position where detecting data was last paused. The memory control circuit 5 compares the audio data last stored on the memory 6 with the detected audio data from the optical disc 1 and, when the two pieces of the audio data coincide with each other, starts storing the audio data on the memory 6 again, starting from data next to the data position where storing data was last ended. The above operation is repeated during the normal-speed reproduction of the optical disc 1.

In order to perform scratch reproduction during the normal-speed reproduction, the not-yet-reproduced audio data is used for the forward scratch reproduction, which is regarded forward judging from the audio data read from the memory 6 in the normal-speed reproduction mode, and the already-reproduced audio data is used for the reverse scratch reproduction, which is regarded reverse in the same manner as above. If the scratch reproduction is started during the normal-speed reproduction of the audio data 5 in FIG. 2 (3) (FIG. 2 (4)) (YES in S6), and if it is the forward scratch reproduction, the microcomputer 10, as soon as a scratch reproduction operation signal is inputted from the operating and displaying unit 11, controls the clock control circuit 9 to vary the clock read from the memory 6 of the memory control circuit 5 so as to control to increase the reproducing speed quickly, while continuing to store the audio data detected from the optical disc 1 on the memory 6. Because the audio data necessary for the scratch reproduction is already stored on the memory 6, scratch reproduction becomes possible simply by varying the reading speed of the audio data stored on the memory 6 irrespectively of the actual detecting speed of the optical disc 1 (within a range of the audio data 5 to 10 in FIG. 2 (4)) (S7).

When a range of the audio data 5 to 10 shown in FIG. 2 (4) is available for scratch reproduction, if the scratch reproduction is performed in a reverse direction, starting from the audio data 10, the microcomputer 10, as soon as a reverse scratch reproduction operation signal is inputted from the operating and displaying unit 11, instructs the memory control circuit 5 to reverse the reproducing direction. The memory control circuit 5 reverses the normal sequence of the reproducing address of each data and outputs the data in a reverse sequence, for example, in the sequence of the audio data 10, 9, 8, and 7 (FIG. 2 (5)).

Even after the scratch reproduction is started, the memory control circuit 5 continues monitoring the volume of the already-reproduced audio data in the same manner as in the normal-speed reproduction. When the scratch reproduction range moves forward up to the range 7 to 12 in the scratch reproduction mode and the data to be scratch-reproduced reaches the audio data 12 just being reproduced as shown in FIG. 2 (6), the microcomputer 10 causes the pickup 3 to detect the audio data from the optical disc 1 and memory control circuit 5 to overwrite into the addresses 19 and 20 on the memory 6 so that the volume of the already-reproduced data becomes equal to that of the not-yet-reproduced data (S8 to S11), (FIG. 2 (7)).

The optical disc reproducing apparatus according to this embodiment makes it possible to vary the reading speed and reading direction of the audio data stored in the memory 6 corresponding to the rotating speed and rotating direction of a jog dial provided on the operating and displaying unit 11 in a similar manner as in manual scratch reproduction using an analog disc.

In this operation, the reproducing speed can be controlled variable by varying only the reading speed of the audio data from the memory 6 by the clock control circuit 9, while the audio data detecting speed from the optical disc 1 is maintained constant.

Because only the reading speed of the audio data from the memory 6 is varied without changing the detecting speed of the audio data from the optical disc 1, the reproducing speed can be varied in a short time and drastically during the normal-speed reproduction of the optical disc 1.

FIG. 2 (7) shows the allocation of the audio data on the memory 6 at the time when the scratch reproduction is ended. As the scratch reproduction range further moves forward from FIG. 2 (6) up to the range 9 to 14, the microcomputer 10 causes the pickup 3 to detect the audio data from the optical disc 1 and memory control circuit 5 to overwrite into the addresses 21 and 22 on the memory 6 so that the volume of the already-reproduced data becomes equal to that of the not-yet-reproduced data (S8 to S11). When the scratch reproduction is ended at the audio data 14, the operation returns to the normal-speed reproduction of the optical disc 1 at the position of the audio data 14 where the scratch reproduction is just ended, and continues normal-speed reproduction of the next audio data 15 and on. The memory control circuit 5 monitors the volumes of both the already-reproduced audio data and the not-yet-reproduced audio data in the same manner as before the scratch reproduction and continues storing the audio data on the memory 6 so that the volume of each data becomes equal, and continues the normal-speed reproduction, while being ready for starting scratch reproduction at any time.

When reproduction is paused during the normal-speed reproduction of the optical disc 1, reading the audio data from the memory 6 is paused and detecting the audio data from the optical disc 1 is also paused as soon as the volume of the already-reproduced audio data becomes equal to that of the not-yet-reproduced audio data.

The microcomputer 10, at the time when the scratch reproduction operation is started, records whether the operation is in a normal-speed reproduction mode or a pause mode and, after the scratch reproduction operation is ended, controls so that the operation returns at the end position of the scratch reproduction to either the normal-speed reproduction mode or the pause mode just before the scratch reproduction.

Figure 4:
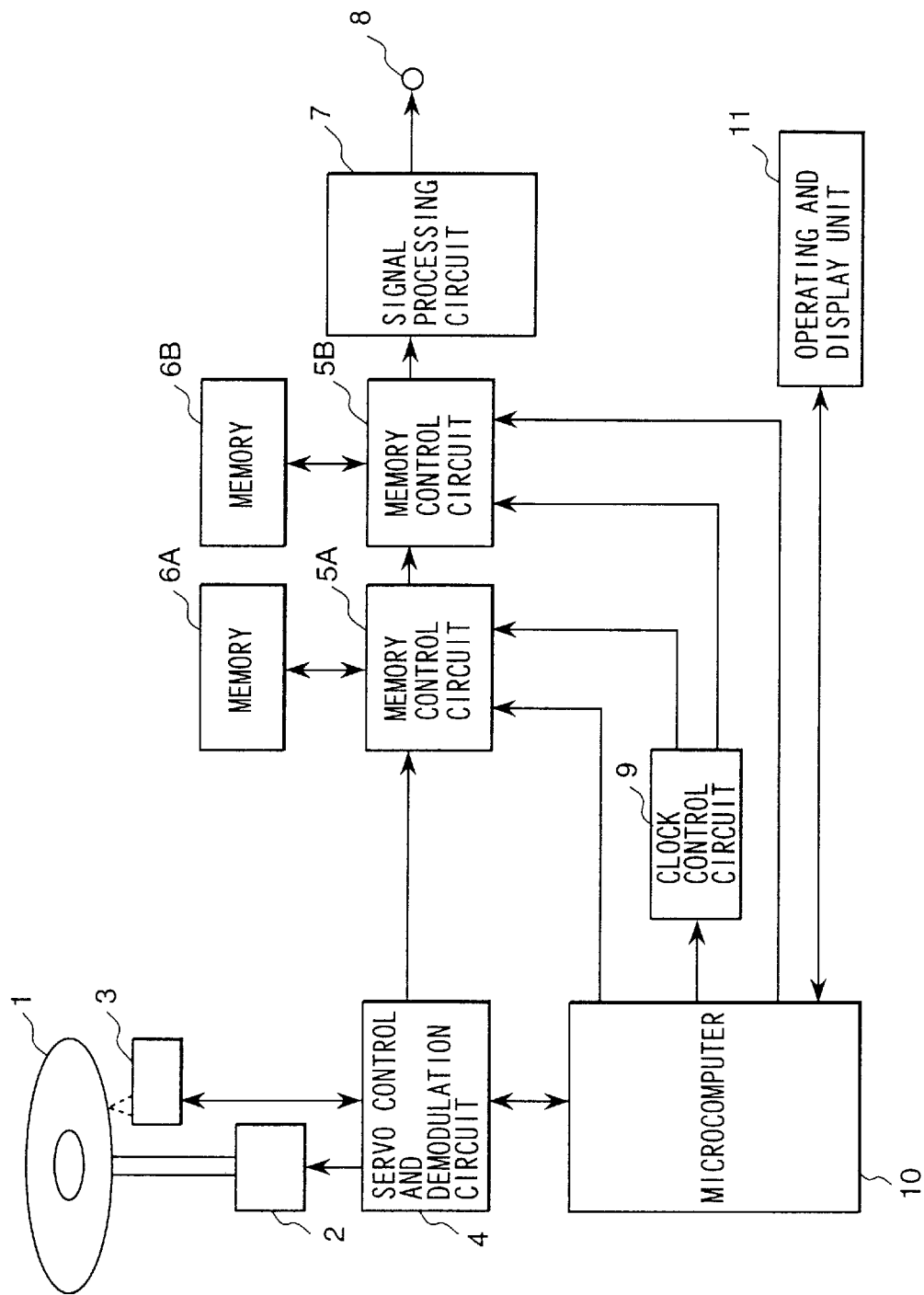
FIG. 4 is a block diagram showing the composition of another embodiment of an optical disc reproducing apparatus of the invention.

FIG. 4 is a block diagram showing the composition of another embodiment of an optical disc reproducing apparatus of the present invention. An optical disc 1 is rotated by a spindle motor 2. A pickup 3 radiates laser beam onto the rotated disc 1 and, with the reflection beam from the optical disc 1, detects the audio data recorded as pits on the optical disc 1. The audio data is detected from the optical disc 1 at double the normal detecting speed of the optical disc A servo control and demodulating circuit 4 controls the rotation of the spindle motor 2, controls the operation of the pickup 3, and processes the demodulating signal of the audio data detected by the pickup 3.

The rotating speed of the spindle motor 2 is controlled by the servo control and demodulating circuit 4 using a synchronizing signal from the optical disc 1 detected by the pickup 3.

The audio data outputted from the servo control and demodulating circuit 4 at double the normal-detecting speed of the optical disc 1 is stored on a memory 6A, from the head of the storage space, via a memory control circuit 5A. The memory control circuit 5A controls the storing and reading of the audio data on/from the memory 6A.

A clock control circuit 9 generates a variable clock for varying the reading speed of data from the memory 6A and memory 6B, and outputs the clock to the memory control circuit 5A and memory control circuit 5B. That is, the speed for reading and outputting the audio data from the memory 6A and memory 6B is set independently from the speed for detecting the data from the optical disc 1.

While the audio data from the memory 6A is read via the memory control circuit 5A and stored temporarily on the memory 6B via the memory control circuit 5B, the data is also outputted, in the normal-speed reproduction mode, to an output terminal 8 via a signal processing circuit 7 at a normal-reproducing speed of the optical disc 1.

For scratch reproduction, the audio data from the memory 6B is outputted to the output terminal 8 via the memory control circuit 5B and the signal processing circuit 7.

The memory control circuit 5B controls the storing and reading of the audio data on/from the memory 6B. The scratch reproduction is operated using the not-yet-reproduced audio data stored on the memory 6A and the already-reproduced audio data stored on the memory 6B.

The signal processing circuit 7 comprises a digital filter, a circuit for converting digital data into analog signal, and an amplifier.

A microcomputer 10 controls the servo control and demodulating circuit 4, memory control circuits 5A and 5B, and clock control circuit 9. For inputting an operation and outputting a display into/from the microcomputer 10, an operating and displaying unit 11, equipped with devices including an operation panel and a display for inputting the reproducing direction and reproducing speed or other information is connected to the microcomputer 10.

In an optical disc reproducing apparatus shown in FIG. 4, the memory 6A is equivalent to a shock-proof memory used in an ordinary optical disc reproducing apparatus.

Figure 5:
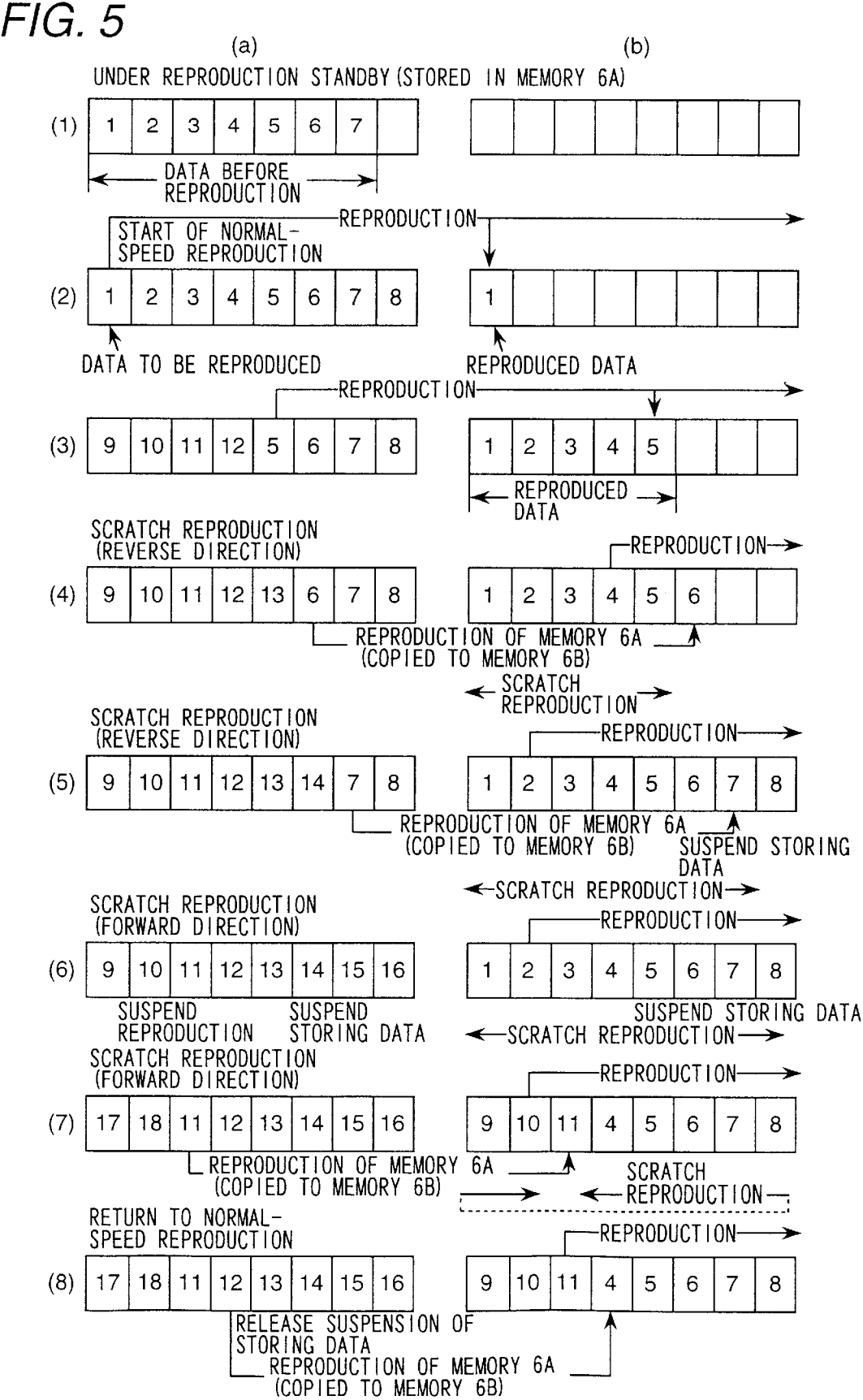
FIG. 5 is a diagram showing the allocation of audio data stored on a memory of another embodiment of an optical disc reproducing apparatus of the invention.
Figure 6:
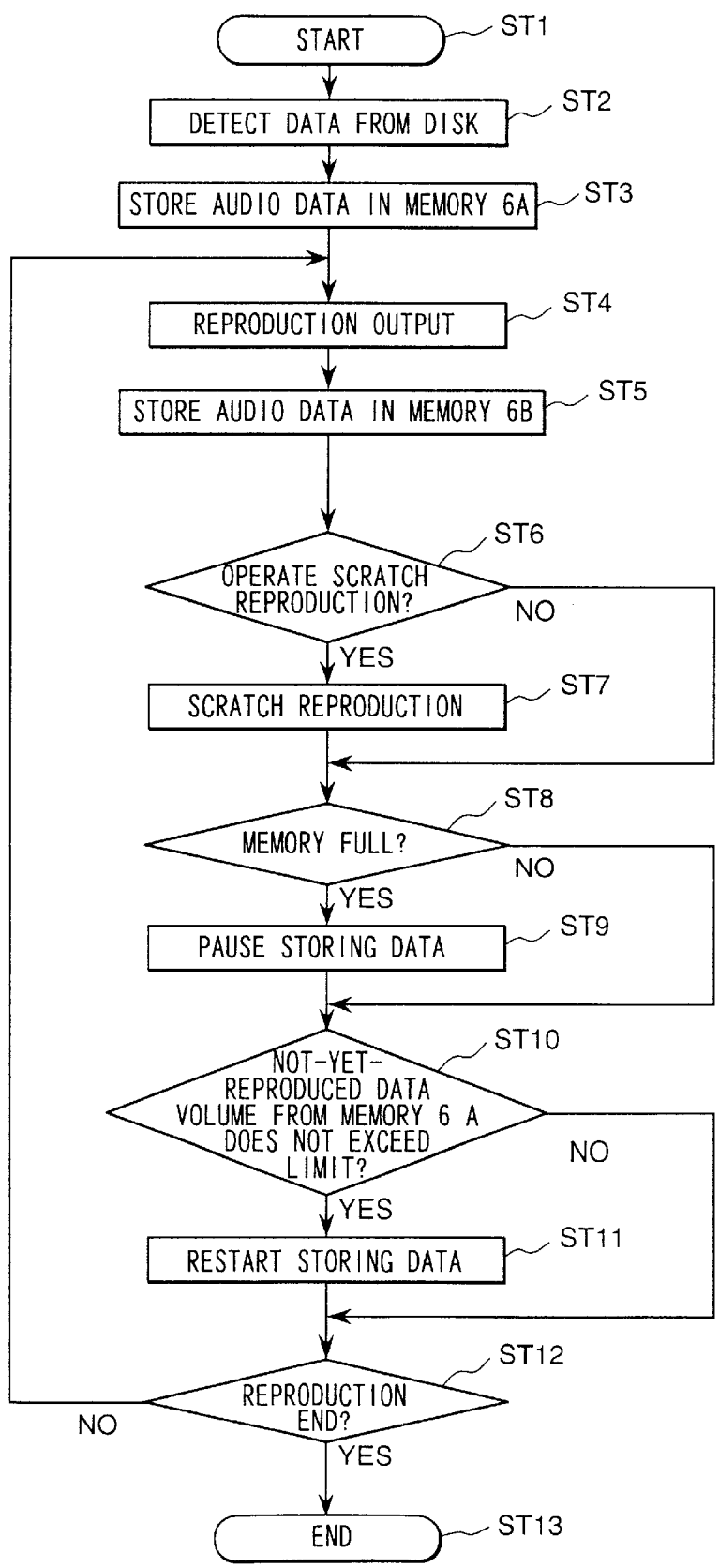
FIG. 6 is a flowchart showing the reproduction operation of another embodiment of an optical disc reproducing apparatus of the invention.

FIG. 5 shows the allocation of the audio data stored on the memory 6A and memory 6B, where 5 (a) shows the allocation of the audio data stored on the memory 6A and 5 (b) shows that on the memory 6B. FIG. 6 is a flowchart showing the reproduction operation of another embodiment of an optical disc reproducing apparatus of the invention.

Detection of the audio data recorded on the optical disc 1 is started using the pickup 3 (ST1, ST2). Audio data is detected from the optical disc 1 at double the normal-reproducing speed of the optical disc 1, and the audio data is stored on the memory 6A sequentially from the head data by the memory control circuit 5A (ST3). As shown in FIG. 5 (1), the audio data is stored on the memory 6A sequentially like No. 1, 2, 3, and so on. The microcomputer 10 and the memory control circuit 5A monitor the available storage space (including the already-reproduced data space) of the memory 6A and, if any available space is caused, detect from the optical disc 1 and store the audio data next to the one last stored.

FIG. 5 (2) shows the allocation of the audio data stored on the memories 6A and 6B after reproduction of the optical disc 1 is started. The memory control circuit 5A reads the audio data already stored on the memory 6A sequentially from the audio data 1 at the reproducing speed that is synchronized with the clock outputted from the clock control circuit 9 by the control of the microcomputer 10, and the audio data is outputted to the output terminal 8 via the memory control circuit 5A, memory control circuit 5B and signal processing circuit 7 (ST4). At the same time, the audio data is also stored on the memory 6B by the memory control circuit 5B as already-reproduced audio data available for scratch reproduction (ST5).

In the normal-speed reproduction operation of the optical disc 1 (NO in ST6), in continuation of the above, the audio data read from the memory 6A is reproduced and outputted sequentially and, at the same time, stored on the memory 6B as shown in FIG. 5 (3) to (4). When the storage space of the memory 6B becomes full as shown in FIG. 5 (5),(YES in ST8), the microcomputer 10 and the memory control circuit 5B overwrite the data 9 and on, which is next to the audio data 8 last stored on the memory 6A, sequentially on the memory 6A, returning to the head of the storage space (audio data address 1).

If the scratch reproduction is started during the normal-speed reproduction of the optical disc 1 (YES in ST6), and if it is the forward scratch reproduction, the microcomputer 10, as soon as a scratch reproduction operation signal is inputted from the operating and displaying unit 11, instructs the clock control circuit 9 to vary the clock read from the memory 6A of the memory control circuit 5A so as to control to increase the reproducing speed quickly, while continuing to detect the audio data from the optical disc 1. Because the audio data necessary for the forward scratch reproduction is already stored on the memory 6A during the reproduction operation, the forward scratch reproduction becomes possible simply by varying the reading speed of the audio data stored on the memory 6A irrespectively of the actual-detecting speed of the audio data from the optical disc 1 (ST7).

If the reverse scratch reproduction is performed using a range of the audio data 1 to 5 stored on the memory 6B as the data to be scratch-reproduced (FIG. 5 (4)), the microcomputer 10, as soon as a reverse scratch reproduction operation signal is inputted from the operating and displaying unit 11, instructs the memory control circuit 5B to reverse the reproducing direction. The memory control circuit 5B reverses the normal sequence of the reproducing address of each data stored on the memory 6B and outputs the data in a reverse sequence, for example, in the sequence of the audio data 5, 4, and 3.

FIG. 5 (5) shows the allocation of the audio data stored on the memories 6A and 6B after the reverse scratch reproduction is started. Even during the scratch reproduction, the memory control circuit 5B continues monitoring the volume of the already-reproduced audio data in the same manner as in the normal-speed reproduction. During the reverse scratch reproduction, the audio data read from the memory 6A is continuously stored on the memory 6B. If no more storage space is available as shown in FIG. 5 (5) (ST8), the memory control circuit 5A is controlled by the memory control circuit 5B via the microcomputer 10 so as to pause reading the audio data from the memory 6A and storing the data on the memory 6B and also to pause reading the audio data from the optical disc 1 (ST9). When reading the audio data from the memory 6A is paused, the memory control circuit 5B detects the pause and pauses storing the audio data on the memory 6B.

In the scratch reproduction operation, because the not-yet-reproduced audio data stored on the memory 6A and the already-reproduced audio data stored on the memory 6B are handled as a series of data, the storing and reading operation of the audio data on/from the memory 6B is synchronized with the reading operation of the audio data from the memory 6A.

As the forward scratch reproduction continues, the microcomputer 10, memory control circuit 5A and memory control circuit 5B control the volume of the not-yet-reproduced audio data stored on the memory 6A so that the data can be scratch-reproduced in continuation of the already-reproduced audio data stored on the memory 6B (FIG. 5 (6) and (7)). For example, if the volume of the not-yet-reproduced audio data stored on the memory 6A available for scratch reproduction becomes less than a specified volume preset in the microcomputer 10 (ST10), the microcomputer 10 causes the memory control circuit 5A and memory control circuit 5B to output the audio data from the memory 6A and restart storing the audio data on the memory 6B (ST11). As soon as the reading operation of the audio data from the memory 6A is restarted and storage space becomes available on the memory 6A, the microcomputer 10 restarts detecting the audio data from the optical disc 1 and storing the audio data on the memory 6A, and controls the memory control circuit 5A and memory control circuit 5B so that the audio data available for scratch reproduction is stored on memory 6A more than a specified volume of the audio data.

FIG. 5 (8) shows the allocation of the audio data stored on the memories 6A and 6B at the time when the scratch reproduction is ended. The operation returns to the normal-speed reproduction of the optical disc 1 at the position of the audio data 10 where the scratch reproduction is just ended, and continues normal-speed reproduction of the next audio data 11 and on. The memory control circuit 5A monitors the volume of both the already-reproduced audio data and the not-yet-reproduced audio data in the same manner as before the scratch reproduction, continues storing the audio data on the memory 6A so that the audio data to be inputted newly is stored in the storage address of each previous audio data which has already been reproduced and outputted from the memory 6A and stored on the memory 6B, and continues the normal-speed reproduction, while being ready for starting scratch reproduction at any time.

When the volume of the not-yet-reproduced audio data on the memory 6A becomes less during the scratch reproduction, as in a case when the scratch reproduction range moves forward, the microcomputer 10 instructs the memory control circuit 5A to restart reading the audio data. Upon detecting that the audio data is outputted from the memory 6A, the memory control circuit 5B restarts storing the audio data on the memory 6B.

When reading the audio data from the memory 6A is restarted and any storage space becomes available on the memory 6A, storing the audio data detected from the optical disc 1 on the memory 6A is restarted. The microcomputer 10 controls the storage of the audio data on the memory 6A and the storage of the audio data from the memory 6A to the memory 6B so that the volume of the already-reproduced audio data becomes equal to that of the not-yet-reproduced audio data so as to be always ready for scratch reproduction.

The microcomputer 10, at the time when the scratch reproduction operation is started, stores whether the operation is in a normal-speed reproduction mode or a pause mode and, after the scratch reproduction operation is ended, controls so that the operation returns at the end position of the scratch reproduction to either the normal-speed reproduction mode or the pause mode just before the scratch reproduction.

The optical disc reproducing apparatus according to this embodiment makes it possible to vary the reading speed and reading direction of the audio data stored in the memories 6A and 6B corresponding to the rotating speed and rotating direction of a jog dial provided on the operating and displaying unit 11 in a similar manner as in manual scratch reproduction using an analog disc.

In this operation, the reproducing speed can be controlled variable by synchronizing the memory 6A with the memory 6B and varying only the reading speed from the memories 6A and 6B by the clock control circuit 9, while the audio data detecting speed from the optical disc 1 is maintained constant.

Because only the reading speed of the audio data from the memories 6A and 6B is varied without changing the detecting speed of the audio data from the optical disc 1, the reproducing speed can be varied in a short time and drastically during the normal-speed reproduction of the optical disc 1.

As described above, according to the present invention, there is provided an optical disc reproducing apparatus which is capable of forward scratch reproduction and reverse scratch reproduction.

Further, according to the present invention, there is provided an optical disc reproducing apparatus which can start scratch reproduction operation during the reproduction of an optical disk at a normal speed and return to the normal-speed reproduction operation after the scratch reproduction is ended.

What is claimed is:

1. An optical disc reproducing apparatus; comprising:
   a pickup means for detecting digital audio data recorded on an optical disc;
   a storing means for storing the digital audio data detected by the pickup means;
   an input means for inputting the reproducing direction and reproducing speed of the digital audio data;
   a control means for controlling the reading and writing of the digital audio data from/into the storing means so as to control the reading direction and reading speed of the digital audio data stored on the storing means based on the reproducing direction and reproducing speed inputted from the input means; and
   a signal processing means for converting the digital audio data read from the storing means into an analog audio signal, and outputting the analog signal;
   wherein the control means controls the reading and writing of the digital audio data from/into the storing means so that the volume of the digital audio data outputted from the signal processing means becomes equal to the volume of the digital audio data not yet outputted from the signal processing means.

2. An optical disc reproducing apparatus according to claim 1, wherein the control means stores, when the reproducing direction and reproducing speed are inputted from the input means, whether the operation is in a normal-speed reproduction mode or a pause mode, and controls so that the operation returns to the normal-speed reproduction mode or the pause mode, when the reproduction mode, which is based on the reproduction direction and reproduction speed inputted from the input means, is ended.

3. An optical disc reproducing apparatus; comprising:
   a pickup means for detecting digital audio data recorded on an optical disc;
   a first storing means for storing the digital audio data detected by the pickup means;
   a second storing means for storing the digital audio data read from the first storing means;
   an input means for inputting the reproducing direction and reproducing speed of the digital audio data;

a control means for controlling the reading and writing of the digital data from/into the first storing means and second storing means so as to control the reading direction and reading speed of the digital audio data stored on the first storing means and second storing means based on the reproducing direction and reproducing speed inputted from the input means; and a signal processing means for converting the digital audio data read from the first storing means or second storing means into an analog audio signal, and outputting the analog signal;

wherein the control means controls so that the digital audio data read from the first storing means is outputted from the signal processing means and, at the same time, is written into the second storing means.

4. An optical disc reproducing apparatus according to claim 3, wherein the control means stores, when the reproducing direction and reproducing speed are inputted from the input means, whether the operation is in a normal-speed reproduction mode or a pause mode, and controls so that the operation returns to the normal-speed reproduction mode or the pause mode, when the reproduction mode, which is based on the reproduction direction and reproduction speed inputted from the input means, is ended.

* * * * *